United States Patent
Fujita

(10) Patent No.: US 6,923,201 B2
(45) Date of Patent: Aug. 2, 2005

(54) GAS FEED DEVICE

(75) Inventor: Nobuo Fujita, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 461 days.

(21) Appl. No.: 10/070,953

(22) PCT Filed: May 10, 2001

(86) PCT No.: PCT/JP01/03906

§ 371 (c)(1),
(2), (4) Date: Mar. 13, 2002

(87) PCT Pub. No.: WO01/86195

PCT Pub. Date: Nov. 15, 2001

(65) Prior Publication Data

US 2002/0148502 A1 Oct. 17, 2002

(30) Foreign Application Priority Data

May 12, 2000 (JP) ........................................ 2000-139331

(51) Int. Cl.[7] ............................................... F17D 1/00
(52) U.S. Cl. ..................................... 137/266; 137/899
(58) Field of Search ................................ 137/255, 487, 137/488, 899, 266

(56) References Cited

U.S. PATENT DOCUMENTS 4,159,516 A * 6/1979 Henrion et al. .............. 137/266
5,014,211 A * 5/1991 Turner et al. ................ 137/266

FOREIGN PATENT DOCUMENTS

| JP | 5-231977 | 9/1993 |
| JP | 5-254353 | 10/1993 |
| JP | 9-257195 | 9/1997 |

* cited by examiner

Primary Examiner—Kevin Lee
(74) Attorney, Agent, or Firm—Pillsbury Winthrop Shaw Pittman LLP

(57) ABSTRACT

A gas feed device for detecting trouble in a gas pressure sensor fitted to the gas feed device. The presence of trouble in pressure sensors is determined according to whether or not gas pressure values detected by the pressure sensors fitted to branch pipes is within an allowable range when stop valves fitted to the branch pipes connected to the access ports of hydrogen absorbing alloy tanks are fully opened from their fully closed state. When the gas feed device is mounted on a vehicle, no special operation is required for trouble detection because the trouble in the pressure sensors can be detected by fully opening the fully closed stop valves when the vehicle is started and normally the trouble can be judged by the mounted equipment.

14 Claims, 2 Drawing Sheets

GAS FEED DEVICE

This application is the National Phase of International Application PCT/JP01/03906 filed May 10, 2001 which designated the U.S. and that International Application was not published under PCT Article 21(2) in English.

TECHNICAL FIELD

The present invention relates to a gas feed device, and more particularly to a gas feed device for feeding gas from a plurality of gas tanks through feeding passages connecting to branch passages which are in turn respectively connected to the plurality of gas tanks.

BACKGROUND ART

Conventional gas feed devices have been proposed for feeding hydrogen from a plurality of hydrogen absorbing alloy tanks to a hydrogen engine. The device proposed in Japanese Patent Laid-Open Publication No. Hei 5-254353, for example, is provided with a stop valve and a pressure sensor in the vicinity of a supply port of each hydrogen absorbing alloy tank to detect opening or closing of the stop valve by the pressure sensor.

However, such gas feed devices sometimes fail to detect the opening or closing of the stop valve. Although opening or closing of the stop valve is sensed by the pressure sensor, opening or closing of the stop valve cannot be detected if the pressure sensor malfunctions. When the pressure sensor malfunctions, the amount of hydrogen remaining in the hydrogen absorbing alloy tank or the amount of hydrogen while hydrogen is being charged cannot be easily or accurately detected.

DISCLOSURE OF THE INVENTION

One object of the present invention is to provide a gas feed device capable of detecting trouble with a sensor or the like for detecting gas pressure. An additional object of the present invention is to provide a gas feed device wherein trouble with a sensor or the like can be detected while the device is normally operating.

In order to achieve one or more of these objects, the gas feed device of the present invention is configured as described below.

The gas feed device of the present invention is directed to a gas feed device for feeding gas from a plurality of gas tanks through feed passages connected with branch passages which are in turn respectively connected to the plurality of gas tanks, comprising stop valves fitted to the respective branch passages; gas pressure detection means which are fitted to the respective branch passages on the side away from the stop valves and nearer the gas tanks; and trouble detecting means which judge a trouble of the gas pressure detecting means on the basis of the opening and closing actions of at least two stop valves among the respective stop valves and the gas pressure detected by the gas pressure detecting means fitted together with the at least two stop valves.

The gas feed device of the present invention determines that there is trouble with the gas pressure detecting means related to the detection on the basis of the opening and closing actions of at least two stop valves among the stop valves which are fitted to the branch passages respectively connected to the plurality of gas tanks and the gas pressure which is detected by the gas pressure detecting means fitted together with the stop valves. Because trouble judgement is based on the opening and closing actions of at least two stop valves and the gas pressure detected at that time, it is not necessary to fit a special device for detecting trouble, and trouble can be detected during normal operation.

In this gas feed device of the present invention, the trouble judgement means may be configured so as to make a positive judgement concerning the presence of trouble when the gas detecting means detect a gas pressure falling below, within a predetermined range, a predetermined value which is determined according to the detected gas pressure among the gas pressure values detected by the gas pressure detecting means. Thus, presence of trouble in the gas pressure detecting means can be judged with higher reliability.

In the gas feed device of the present invention, the plurality of gas tanks can be tanks which have therein a hydrogen absorbing alloy and store hydrogen. The gas feed device of the present invention can be mounted on a vehicle and configured to feed hydrogen from the plurality of gas tanks to hydrogen consuming equipment mounted on the vehicle. Here, "hydrogen consuming equipment" includes a hydrogen engine, a fuel cell, and the like.

In the vehicle-mounted gas feed device of the present invention, stop valve control means which fully close the stop valves of the plurality of gas tanks when the vehicle operation is stopped and fully open the stop valves of the plurality of gas tanks when the vehicle is started may be provided, and the trouble judgement means may be configured so as to make a positive judgement concerning the presence of trouble when it is detected that the stop valves are fully opened when the vehicle is started. Thus, the trouble of the gas pressure detecting means can be judged when the vehicle is started.

The gas feed device of the present invention may also be configured to additionally comprise trouble output means which output a notification concerning the trouble when the trouble judgement means judge the presence of trouble. This allows prompt action to be taken to deal with detected trouble in the gas pressure detecting means.

BEST MODE FOR CARRYING OUT THE INVENTION

Figure 1:
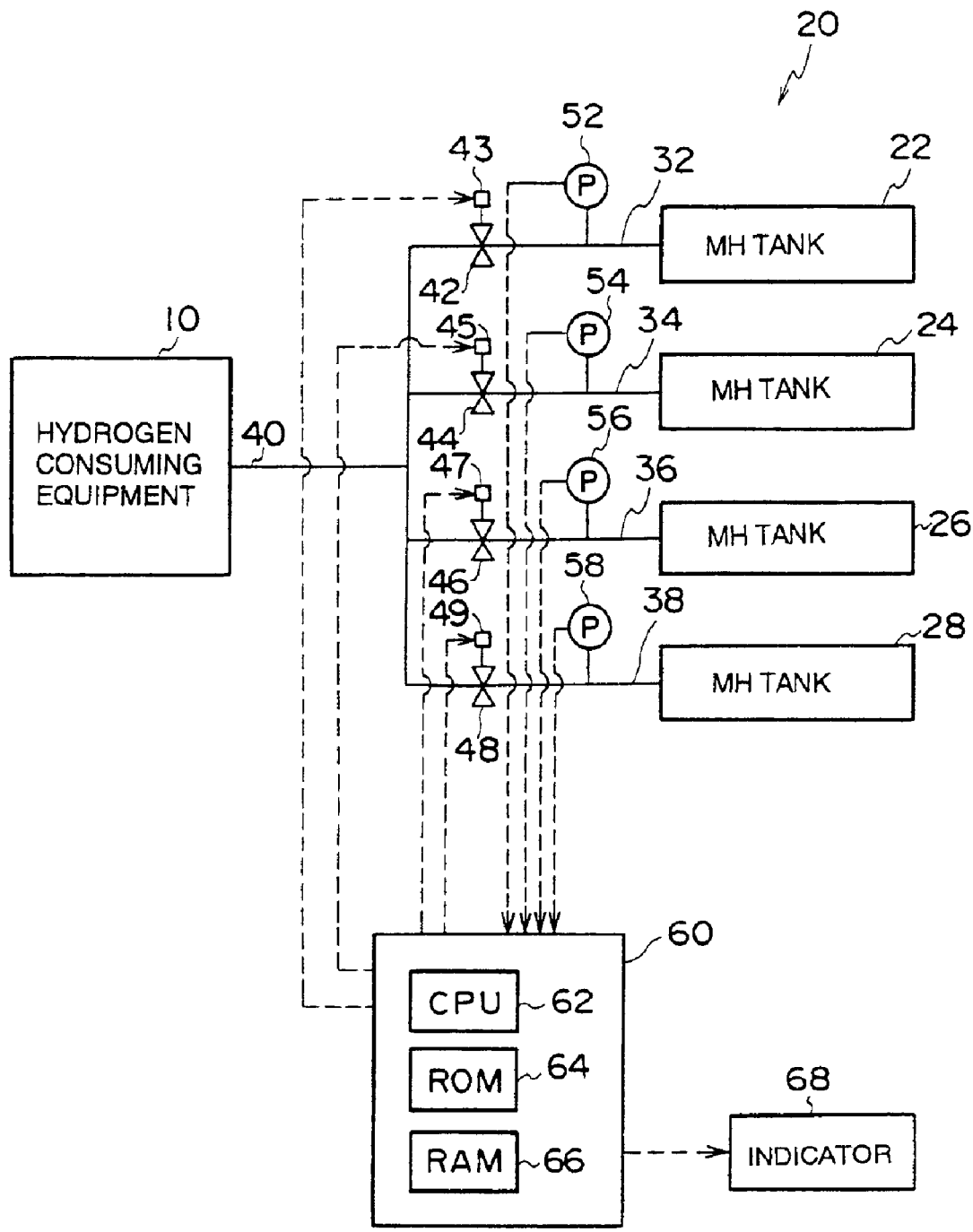
FIG. 1 is a structural diagram schematically showing the structure of a gas feed device 20 according to a vehicular mounted embodiment of the present invention.

The best mode for carrying out the present invention will be described with reference to an example embodiment. FIG. 1 is a structural diagram outlining the structure of the gas feed device 20 according to one embodiment of the present invention. The gas feed device 20 according to the present embodiment is mounted on a vehicle. The gas feed device 20 of the embodiment is provided with hydrogen absorbing alloy tanks 22 to 28 which can feed hydrogen to hydrogen consuming equipment 10, such as a fuel cell or a hydrogen engine mounted on a vehicle, and an electronic control unit 60 which controls the feed of hydrogen from the hydrogen absorbing alloy tanks 22 to 28 as shown in the drawing.

The hydrogen absorbing alloy tanks 22 to 28 are connected to the hydrogen consuming equipment 10 via a feed pipe 40 through branch pipes 32 to 38 which are connected to respective access ports. Stop valves 42 to 48 which control the feeding of hydrogen from the respective hydrogen absorbing alloy tanks 22 to 28 are fitted to the branch pipes 32 to 38. And, pressure sensors 52 to 58 for detecting a gas pressure in the pipes are fitted to the branch pipes 32 to 38 on the side away from the stop valves 42 to 48 and nearer the tanks.

The electronic control unit 60 is configured as a microprocessor having a CPU 62 at the core and provided with a ROM 64 which stores a processing program, a RAM 66 which temporarily stores data, and an I/O port (not shown). Information such as gas pressure values P from the pressure sensors 52 to 58 is input to the electronic control unit 60 via input ports. A drive signal to actuators 43 to 49 of the stop valves 42 to 48 and a lighting signal to an indicator 68 are output from the electronic control unit 60 through output ports.

Figure 2:
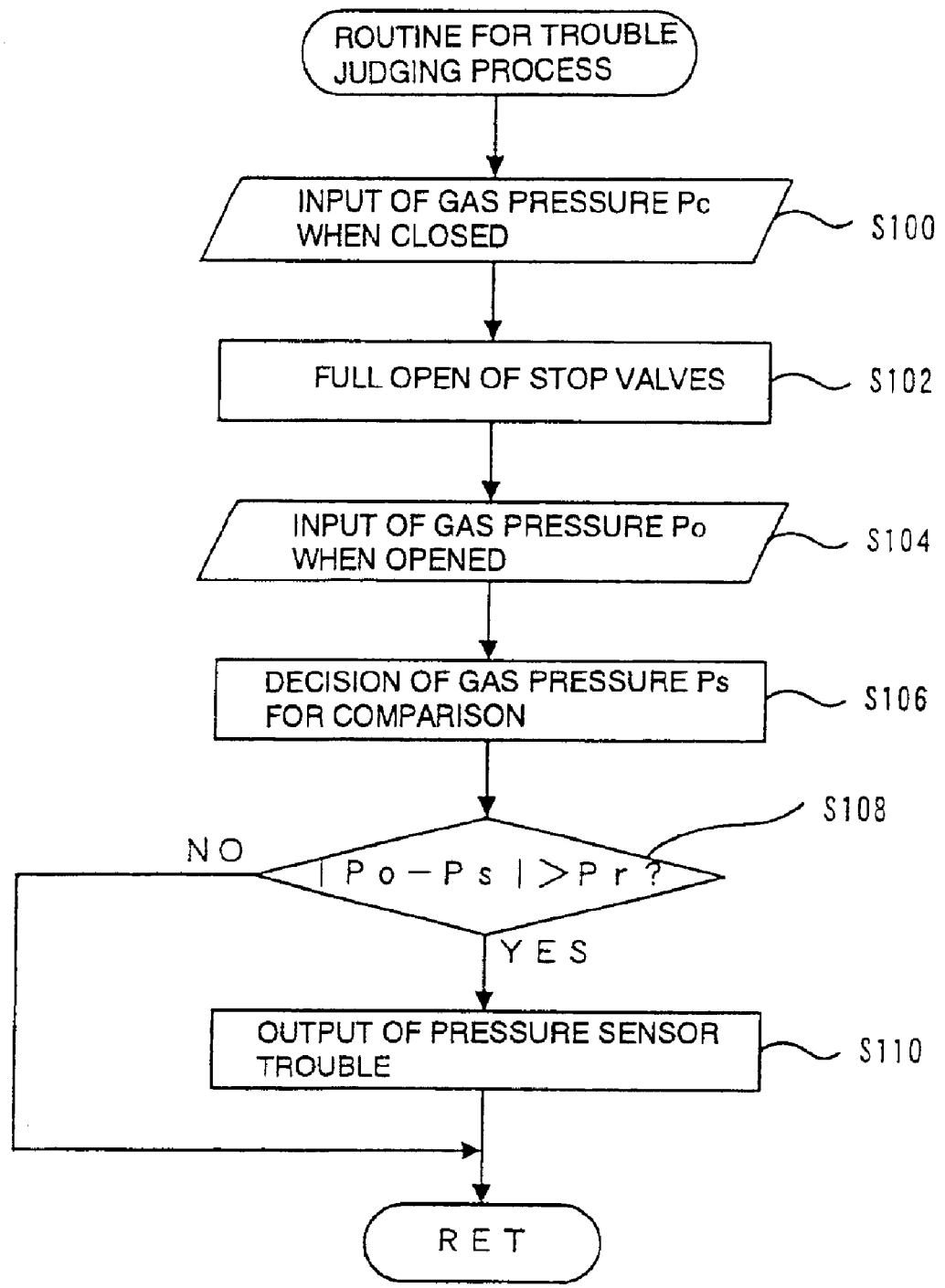
FIG. 2 is a flowchart showing an example trouble judgement process routine executed by an electronic control unit 60 of the gas feed device of FIG. 1.

Next, the operation of the gas feed device 20 of the embodiment configured as above, and particularly an operation to detect trouble in the pressure sensors 52 to 58, will be described. FIG. 2 is a flowchart showing an example routine for a trouble judgement process performed by the electronic control unit 60 of the gas feed device 20 of the embodiment. This routine is performed when the vehicle is started.

When a routine for trouble judgement process is performed, the CPU 62 of the electronic control unit 60 performs processing of reading gas pressures Pc1 to Pc4 of the respective hydrogen absorbing alloy tanks 22 to 28 with the stop valves 42 to 48 to be detected by the pressure sensors 52 to 58 in a fully closed state (step S100). Here, in the flowchart of FIG. 2, the gas pressures Pc1 to Pc4 to the respective hydrogen absorbing alloy tanks 22 to 28 are simply indicated as "Pc" without their individual designations "1 to 4".

The stop valves 42 to 48 are then fully opened (step S102), and gas pressures Po1 to Po4 are read are measured by the pressure sensors 52 to 58 (step S104). A comparison gas pressure Ps used to judge trouble in the read gas pressures Po1 to Po4 is then determined (step S106). The gas pressure Ps can be determined as an average value by, for example, selecting three values having a small deviation from among the values for gas pressures Po1 to Po4.

After the comparison gas pressure Ps has been determined, respective deviations of the comparison gas pressure Ps and the gas pressures Po1 to Po4 are compared with a threshold Pr (step S108). Here, the threshold Pr is determined as an allowable error with respect to the pressure sensors or a value slightly larger than that. When any deviation exceeds the threshold Pr, it is judged that trouble has occurred in the pressure sensor which has detected the gas pressure Po related to the pertinent deviation, then the relevant indicator 68 is illuminated to output the trouble (step S110), and this routine is terminated. When every deviation is equal to or below the threshold Pr, it is judged that no trouble can be found in any of the pressure sensors 52 to 58, and this routine is terminated.

Trouble in any of the pressure sensors 52 to 58 can be detected with the gas feed device 20 of the embodiment described above. A special operation for judging trouble is not necessary because trouble is judged during the normal operation for starting the vehicle. The judgment of the trouble is made on the basis of the opening and closing action of the stop valves 42 to 48, which are normally fitted to the hydrogen absorbing alloy tanks 22 to 28, and the gas pressure values from the pressure sensors 52 to 58, which are normally fitted to the hydrogen absorbing alloy tanks 22 to 28. Therefore, provision of another sensor or the like for trouble judgement is unnecessary.

Although the example gas feed device 20 of the embodiment judges a trouble of the pressure sensors 52 to 58 by fully opening the stop valves 42 to 48 which are fully closed when the vehicle is started, the present invention is not limited to a configuration in which judgement is made when the vehicle is started. Trouble with the pressure sensors 52 to 58 can, for example, be judged anytime the fully closed stop valves 42 to 48 are fully opened.

And, although the gas feed device 20 of the illustrative embodiment judges trouble of the pressure sensors 52 to 58 by fully opening all of the fully closed stop valves 42 to 48, the device may be configured to simultaneously open two or more stop valves among the fully closed stop valves 42 to 48 and to judge trouble of the pressure sensors which are mounted together with the opened stop valves related to the opening on the branch pipes. With such a configuration, when three or more stop valves are opened or closed, the comparison gas pressure Ps may be determined from two or more gas pressures Po having a small deviation among them and, when two stop valves to be opened or closed, one of them may be determined as the comparison gas pressure Ps to judge the trouble. In such a case, it cannot be judged which pressure sensor is the source of the trouble, but it can be judged that there is trouble with at least one of the pressure sensors.

The example gas feed device 20 of the preferred embodiment is configured to feed hydrogen from the hydrogen absorbing alloy tanks 22 to 28, but hydrogen may be fed from a hydrogen tank not incorporating a hydrogen absorbing alloy. The present invention may also be applied to a device for feeding gas other than hydrogen.

Also, while the in the embodiment, a vehicular mounted gas feed device 20 has been described, this is not a requirement of the present invention, which may be configured as, or used with, a device not mounted on any type of vehicle.

In general, while there has been described the embodiment for the mode of carrying out the present invention, it is to be understood that the present invention is not limited to the embodiment and can be carried out in various modes without departing from the point of the present invention.

INDUSTRIAL APPLICABILITY

This gas-feed device may be used for an apparatus which feeds hydrogen to a hydrogen engine, a fuel cell, or the like mounted on a vehicle.

What is claimed is:

1. A gas feed device for feeding gas from a plurality of gas tanks through feed passages communicated with branch passages which are respectively connected to the plurality of gas tanks, comprising:

stop valves mounted on the respective branch passages;

gas pressure detection means which are fitted to the respective branch passages on the side away from the stop valves and nearer the gas tanks; and trouble judgement means which judge a trouble of the gas pressure detecting means on the basis of the opening and closing actions of at least two stop valves among the respective stop valves and the gas pressure detected by the gas pressure detecting means fitted together with the stop valves.

2. The gas feed device according to claim 1, wherein, in connection with values detected when a plurality of stop valves related to the opening and closing operations are opened, the trouble judgement means make a positive judgement concerning the presence of trouble when the gas detecting means detect a gas pressure falling below, within a predetermined range, a predetermined value which is determined according to the detected gas pressure among the gas pressure values detected by the gas pressure detecting means.

3. The gas feed device according to claim 1 or 2, wherein the plurality of gas tanks are tanks which incorporate a hydrogen absorbing alloy and store hydrogen.

4. The gas feed device according to claim 3, wherein the gas feed device is a vehicular mounted gas feed device for feeding hydrogen from the plurality of gas tanks to hydrogen consuming equipment mounted on a vehicle.

5. The gas feed device according to claim 4, wherein:

stop valve control means are provided to fully close the stop valves of the plurality of gas tanks when the vehicle operation is stopped and to fully open the stop valves of the plurality of gas tanks when the vehicle is activated, and the trouble judgement means make a positive judgement concerning the presence of trouble when it is detected that the stop valves are fully opened when the vehicle is started.

6. The gas feed device according to claim 1, further comprising:

trouble output means for outputting a trouble notification when the trouble judgement means make a positive judgement concerning the presence of trouble.

7. A vehicle comprising the gas feed device according to claim 1.

8. A gas feed device for feeding gas from a plurality of gas tanks through feed passages communicated with branch passages which are respectively connected to the plurality of gas tanks, comprising:

stop valves mounted on the respective branch passages;

gas pressure detectors which are fitted to the respective branch passages on the side away from the stop valves and nearer the gas tanks; and an electronic control unit configured to judge a trouble of the gas pressure detectors on the basis of the opening and closing actions of at least two stop valves among the respective stop valves and the gas pressure detected by the gas pressure detectors fitted together with the stop valves.

9. The gas feed device according to claim 8, wherein, in connection with values detected when a plurality of stop valves related to the opening and closing operations are opened, the electronic control unit makes a positive judgement concerning the presence of trouble when the gas detectors detect a gas pressure falling below, within a predetermined range, a predetermined value which is determined according to the detected gas pressure among the gas pressure values detected by the gas pressure detectors.

10. The gas feed device according to claim 8 or 9, wherein the plurality of gas tanks are tanks which incorporate a hydrogen absorbing alloy and store hydrogen.

11. The gas feed device according to claim 10, wherein the gas feed device is a vehicular mounted gas feed device for feeding hydrogen from the plurality of gas tanks to hydrogen consuming equipment mounted on a vehicle.

12. The gas feed device according to claim 11, wherein:

stop valve actuators are provided to fully close the stop valves of the plurality of gas tanks when the vehicle operation is stopped and to fully open the stop valves of the plurality of gas tanks when the vehicle is activated, and the electronic control unit makes a positive judgement concerning the presence of trouble when it is detected that the stop valves are fully opened when the vehicle is started.

13. The gas feed device according to claim 8, further comprising:

an indicator configured to output a trouble notification when the electronic control unit makes a positive judgement concerning the presence of trouble.

14. A vehicle comprising the gas feed device of claim 8.

* * * * *